United States Patent Office.

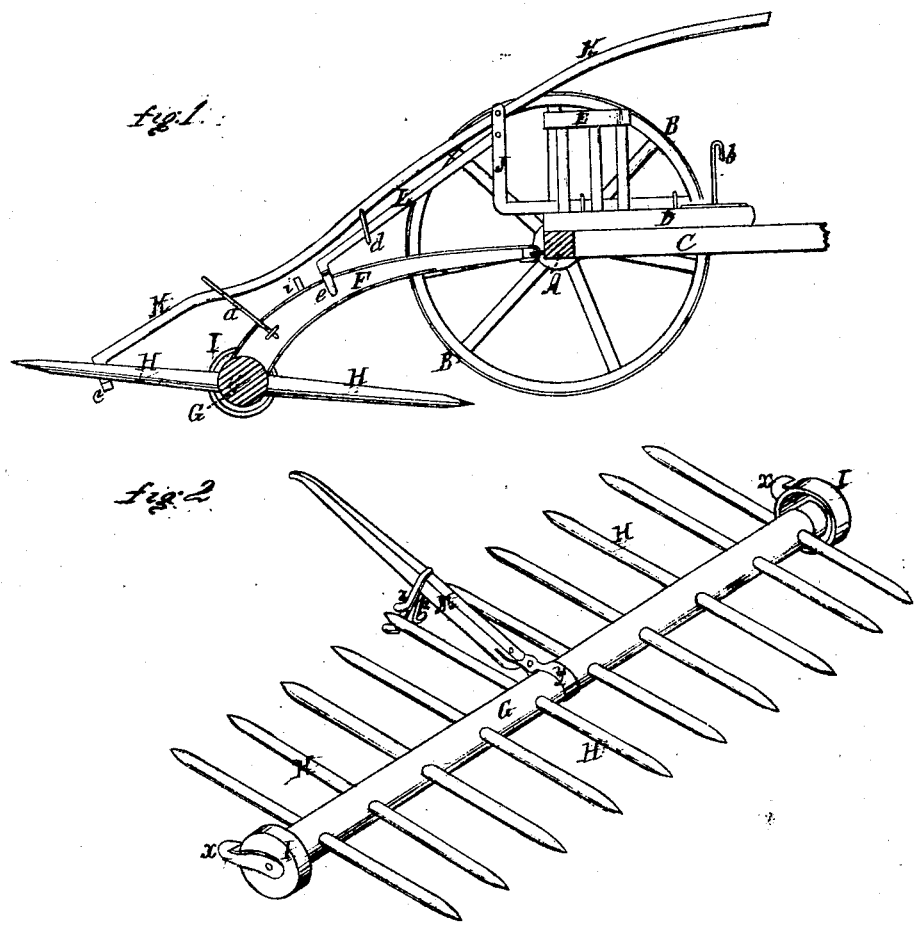

S. D. MILAM, OF LEOTI, INDIANA.

Letters Patent No. 90,286, dated May 18, 1869.

---

IMPROVEMENT IN HORSE-RAKES.

---

The Schedule referred to in these Letters Patent and making part of the same.

---

*To all whom it may concern:*

Be it known that I, S. D. MILAM, of Leoti, in the county of Pike, and in the State of Indiana, have invented certain new and useful Improvements in Horse-Rake; and I do hereby declare that the following is a full, clear, and exact description thereof, reference being had to the accompanying drawings, and to the letters of reference marked thereon.

The nature of my invention consists in the construction and general arrangement of a horse hay-rake, which will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a side view in section of my hay-rake, with carriage-attachment, and Figure 2 is a perspective of the rake proper, when used without a carriage.

A represents the axle, B, one of the wheels, and C, one of the shafts of the carriage.

On the axle and shafts is placed a platform, D, on which is placed the driver's seat E.

On the rear side of the axle A, are hinged or pivoted three curved bars F F, the outer rear ends of which are provided with loops that surround the rake-head G, allowing the rake to revolve in said loops.

The teeth H H, which pass through the rake-head, may be made in any of the known and usual ways.

At each end of the rake-head G, is placed a wheel, I, whereby the friction in dragging over the ground, as in ordinary rakes, is entirely obviated.

The wheels I I are made with an inside flange, to prevent the hay from getting between the head or end of the shaft and the wheel.

On the platform D, is a standard, J, in which a lever, K, is pivoted, the front end of said lever passing within reach of the driver, while the rear end passes through a loop, *a*, on the centre bar F, so that the operator may raise or lower the rake at pleasure.

The upper end of the loop *a*, I may provide with a small roller on the inner side, against which the lever would bear, and thus do away with all unnecessary friction.

When the rake is raised up by the lever K, the front end is held by a hook, *b*, on the platform.

The rear end of the lever K is provided with a catch or hook, *c*, which catches on the rear teeth for the purpose of setting the rake in the proper position when at work.

Under the lever K runs a bar, L, the front end of which is pivoted in the standard J, and the rear end, after passing through a loop, *d*, on the under side of the lever, is provided with a fork, *e*, resting on the centre bar F.

At a suitable point on this bar F, is a pin, *i*, against which the fork *e* presses, thus preventing the rake from revolving until the lever K is raised sufficiently to allow the loop *d* to release the said fork from the pin *i*.

Having thus fully described my invention,

What I claim as new, and desire to secure by Letters Patent, is—

1. Providing the ends of a rake-head with wheels flanged on the inner side, substantially as and for the purposes herein set forth.

2. In combination with the carriage A B C D, the hinged or pivoted bars F F, rake-head G, teeth H H, and wheels I I, all constructed and arranged to operate substantially as and for the purposes herein set forth.

3. The combination of the standard J, lever K, hook *c*, and loop *a*, for the purpose of raising and lowering and setting the rake, substantially as herein set forth.

In testimony that I claim the foregoing, I have hereunto set my hand, this 27th day of February, 1869.

S. D. MILAM.

Witnesses:
ELIJAH LUCAS,
GEORGE BEE.